United States Patent Office 3,020,192
Patented Feb. 6, 1962

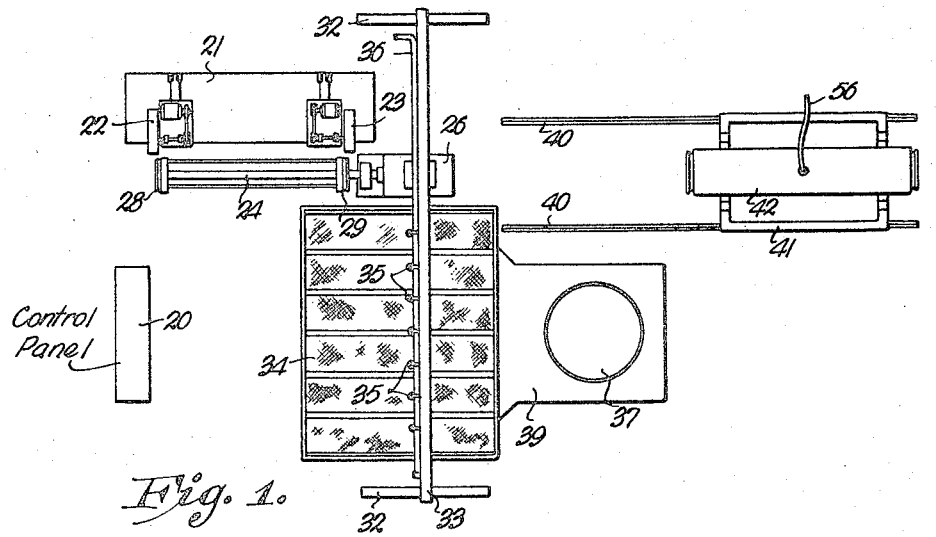
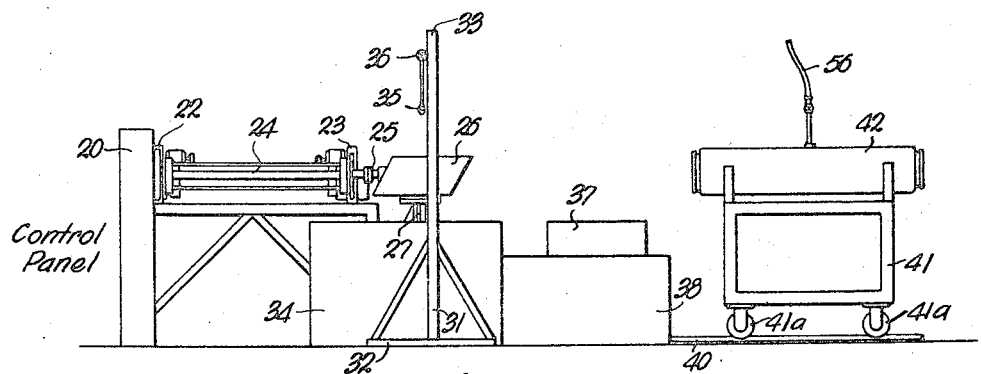
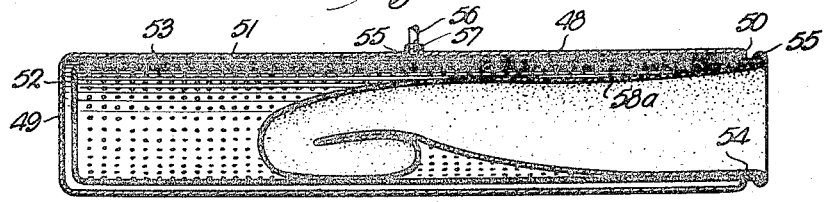
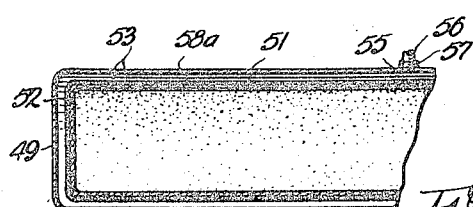

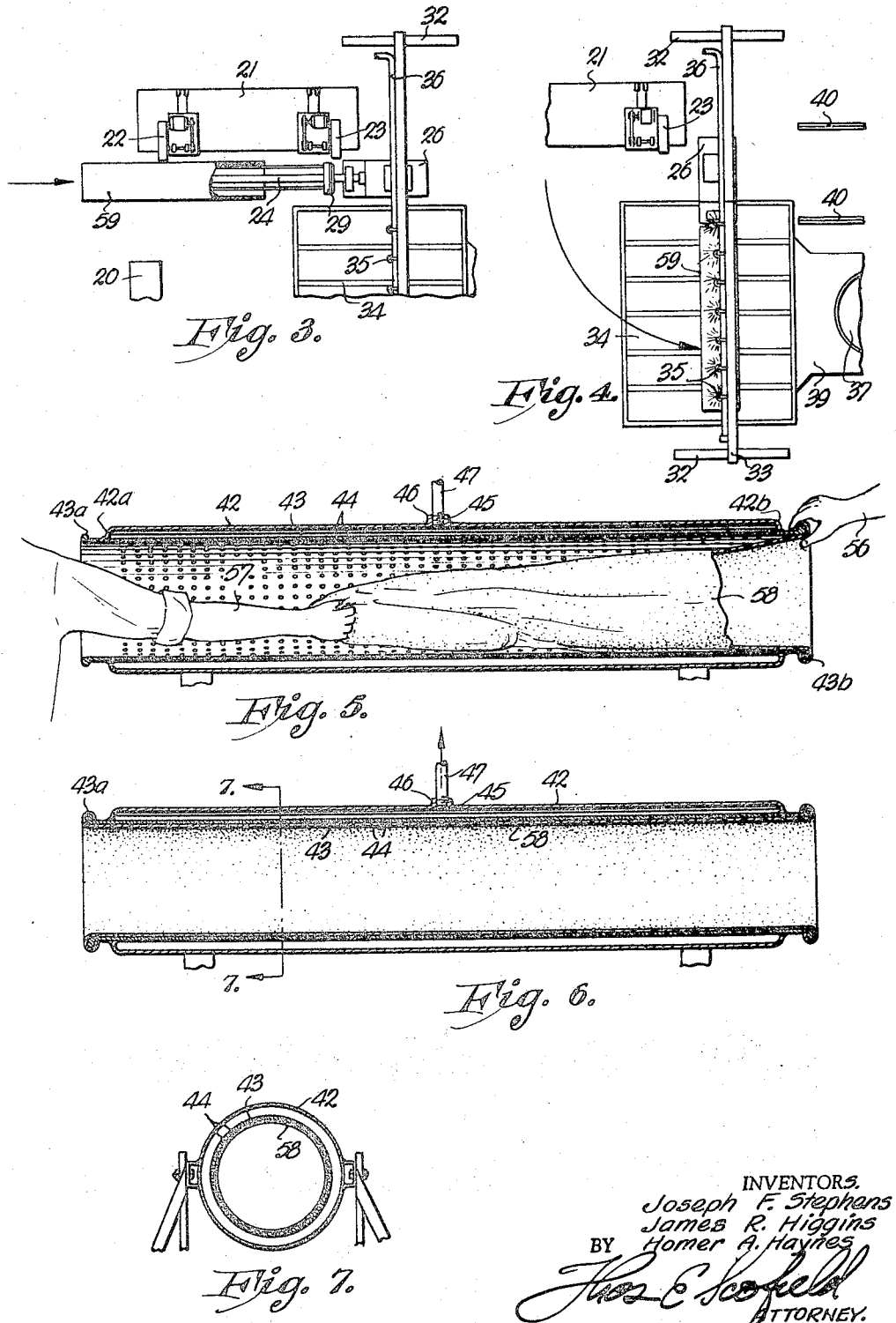

3,020,192
METHOD AND APPARATUS FOR APPLYING
RESILIENT SLEEVES
Joseph F. Stephens and James R. Higgins, Jackson County, Mo., and Homer A. Haynes, Wyandotte County, Kans., assignors to Gustin-Bacon Manufacturing Company, a corporation of Missouri
Filed Oct. 8, 1958, Ser. No. 766,071
7 Claims. (Cl. 156—423)

This invention relates to methods and apparatus for applying resilient sleeves to outer surfaces of bodies and refers more particularly to such methods and apparatus wherein a resilient sleeve is first expanded to an inside dimension greater than the outer dimension of a body by application of vacuum thereto to permit the insertion of the body within the sleeve.

This invention is particularly applicable to and will be described relative to the application of resilient plastic sleeves to the external surfaces of relatively resilient walled ducts and pipes, but it will be understood that the method and apparatus are adaptable to the application of resilient sleeves to the external surfaces of any types of bodies. Ducts and pipes formed from resilient mats fabricated from fine diameter glass fibers bonded with plastic binders are currently being used in great quantities. It is eminently desirable in many instances to have smooth coverings on the outer surfaces of these ducts and pipe sections. Various means have been developed for applying plastic sheets of vinyl and the like to the outside surfaces of pipe sections and mats. However, the conventionally available methods and their results have not proved satisfactory. In the first place, the fitting of the sleeves on the ducts has not proved satisfactory and both wrinkling and inadequate holding of the seams of the sleeves have been encountered. Therefore, it would be greatly desirable to provide methods and apparatus for applying formed tubes of resilient plastic material and the like to the external surfaces of such ducts. Such methods and apparatus must lend themselves to present high speed mass production techniques and provide a uniform, attractive product.

Therefore, an object of the invention is to provide methods of and apparatus for applying resilient sleeves to the outer surfaces of bodies.

Another object of the invention is to provide methods of and apparatus for expanding resilient sleeves to an internal dimension greater than the normal internal dimension of the sleeve whereby to permit insertion of bodies of external dimensions close to or equal the normal internal dimensions of the sleeves therein.

Another object of the invention is to provide methods of and apparatus for applying resilient sleeves to bodies which permit the safe, fast and accurate application of the sleeves to the body with a resultant uniform highly attractive product.

Another object of the invention is to provide such methods of and apparatus for applying resilient sleeves to bodies which have adhesive spread over large portions of the exterior surfaces or surface thereof.

Another such object of the invention is to provide such methods and apparatus which require a minimum amount of manual labor, a minimum amount of skilled handling of materials and the like.

Still another object of the invention is to provide such methods and apparatus wherein the resilient sleeve may be expanded for slipping over the body by a single man.

Other and further objects of the invention will appear in the course of the following description thereof.

In the drawings, which form a part of the instant invention and are to be read in conjunction therewith, embodiments of the invention are shown and, in the various views, like numerals are employed to indicate like parts.

FIG. 1 is a plan view of an arrangement of apparatus for the application of resilient sleeves to hollow ducts with adhesive on the exterior surfaces thereof.

FIG. 2 is a side view of the apparatus of FIG. 2, the views of FIGS. 1 and 2 taken before the beginning of the inventive process.

FIG. 3 is a view of the beginning of the inventive process in the apparatus of FIGS. 1 and 2 wherein the duct is being applied to the duct mounting means.

FIG. 4 illustrates a sequential step in the operation of the inventive process wherein the mounted duct has been moved under apparatus to apply an adhesive coat thereto FIG. 5 shows the insertion of a resilient sleeve within a first form of the device to expand said sleeve.

FIG. 6 is a side sectional view of the apparatus of FIG 5 showing the resilient sleeve expanded therein.

FIG. 7 is a view taken along the lines 7—7 of FIG. ( in the direction of the arrows.

FIG. 13 is a side-sectional view of a closed end sleev being inserted in a second and preferred form of the sleev expanding device.

FIG. 14 is a view like that of FIG. 13 with the sleev fully expanded in the preferred device.

Figure 8:
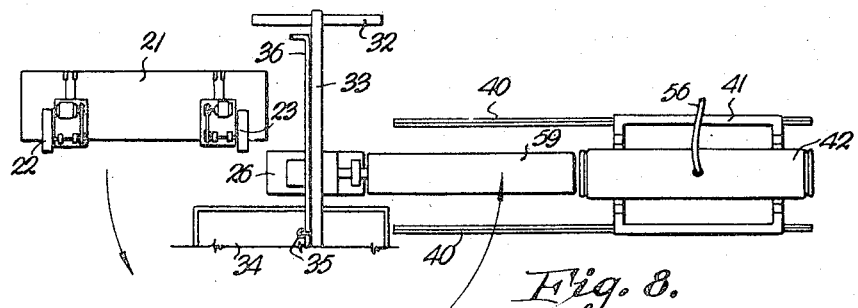
FIG. 8 is a sequential view subsequent to FIG. 4 where in the adhesive carrying duct has been moved to a thir position for application of the sleeve thereto.
Figure 9:
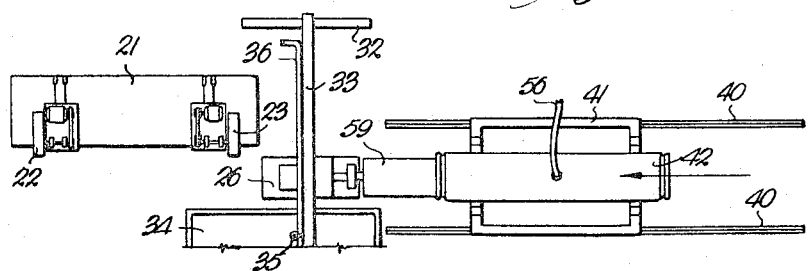
FIG. 9 is a sequential view subsequent to FIG. 8 where in the sleeve expanding means has been moved over th adhesive carrying duct.

The general layout of the apparatus shown in sequentia operation in FIGS. 1, 2, 3, 4, 8, 9, 10 and 11 will be firs described. At 20 is shown the control panel for the en tire operating process. The numeral 21 designates a tabl supporting two power saws 22 and 23. A mandrel 2 is rotatably mounted on shaft 25 which is driven by motor positioned within hooded section 26. Section 26 pivotally mounted on legs 27 to permit the pivotin of the mandrel 24 180° counterclockwise, to an opposit position from that shown in FIG. 1. Means are provide such as expandable circumferential rubber tubes 28 an 29 at the ends of the mandrel operated by air pressure t expand and contract to grip and release bodies slid ont the mandrel having inner diameters substantially th: of the outer diameter of the mandrel.

A frame having vertical members 31 fixed at their low ends to horizontal floor based members 32 and topp by horizontal top members 33 is provided extending ov the mandrel mounting frame 27 and also over tank 3 The latter is of a width in the direction of members 2 substantially greater than the length of mandrel 24 ar of a length in the direction of members 32 substantia: greater than the width of mandrel 24. A plurality spray nozzles 35 are provided suspended from membe 33 and connected to flow line, pipe or hose 36. Flo line 36 carries an adhesive solution to spray heads : which operate to spray the adhesive in a uniform, di fused manner downwardly into the tank 34 and over ar article such as a body mounted on mandrel 24 which spaced between the spray heads and the tank. Mea such as a conventional fan or the like are provided at : connected by duct 38 to the underside of tank 34 provide a flow of air into the tank which will tend draw spray particles of adhesive thereinto and also remove any fumes of adhesive from the air in the vicinity.

A pair of tracks 40 extend parallel to table 21 and the position of the mandrel in FIG. 1 and equally spaced on each side of the latter. A frame 41 is mounted on said tracks 40 by wheels 42 to permit motion of the frame back and forth on the tracks 40 toward and away from legs 27.

FIGURES 5–7, inclusive, show one form of the sleeve expanding means which may be mounted on frame 41. FIGS. 13 and 14 show a preferred modification of this expanding means. The construction of FIGS. 5–7 is illustrated in the sequential figures and will be first described. An elongate outer shell 42 is provided which is inwardly formed near the open ends thereof as at 42a and 42b. An elongate, uniformly perforated screen or inner hollow tube 43 having perforations 44 therein is centered within the outer hollow tube 42, extends past the ends 42a and 42b thereof and is circumferentially welded or otherwise fixedly attached therein in sealing fashion. The perforations 43 stop short of the connection to portions 42a and 42b. Rims 43a and 43b are provided circumferential to the free open ends of perforated tube 43 of greater outside diameter than the outside diameter of the tube 43. Opening 45 extends through the wall of outer tube 42 and has internally threaded block 46 having an opening therethrough matching opening 45 fixed circumferential to the opening 45. Vacuum flow line 47 is threaded into block 46. While tubes 42 and 43 are shown as cylindrical in cross section, it is understood that they may be of any matching cross section, such as square, hexagonal, octagonal, etc. to match the outside form of a body to be inserted therein. It is necessary that tube 43 be at least substantially uniformly spaced inwardly at all points from the tube 42 and also that the perforations 43 be so sized relative the vacuum which is to be pulled in the annulus between tubes 42 and 43 that a substantially uniform vacuum is provided within tube 43. Vacuum connection 47 is preferably centrally positioned of the ends of the two tubes to help provide such uniform suction.

FIGS. 13 and 14 show the preferred modification of the sleeve expanding device wherein the outer hollow tube 48 has one end thereof closed as at 49, the other end having inwardly turned edges as at 50. Central hollow tube 51 has closed end thereof 52 spaced inwardly from end 49 a distance equal to the distance sleeve 51 is spaced inwardly from outer tube 48 along the remainder of its length within tube 48. Perforations 53 are of the same character as in the showing of FIGS. 5 and 6 and are evenly spaced over the entire area of tube 51 ending adjacent its circumferential sealing connection at 54 with outer tube 50. Circumferential rim 55, of greater outer diameter than the remainder of the inner tube 51 is provided at the free end of tube 51. Vacuum connections 56 is threaded into block 57 fixed to the outer surface of tube 48 and connects the vacuum connection with opening 58 through the outer tube 48. The cross sectional form of the tubes 48 and 51 as in FIGS. 5 and 6 may be as desired but is preferably circular.

The invention, both apparatus and method, will be described relative the application of a vinyl plastic sheet to a relatively resilient wall duct formed of glass fiber mat. A cylindrical duct of the type disclosed in the patent to Stephens, No. 2,790,464, issued April 30, 1957, entitled "Insulated Duct" fabricated of a mat of the character disclosed in Stephens Patent No. 2,778,759, issued January 22, 1957, entitled "Thermal-Pipe Insulation" is typical of that employed as the specific example. However, other bodies of any shape, size, form, material, etc. may be employed, provided the elements of the apparatus described are sized so as to fit and be usable with such bodies. A plastic sheet or film or a sheet or film of other suitable material may be employed. Vinyl plastic having a 150 percent stretch limit and a maximum 10 percent diameter increase is suitable and preferred, but other resilient film materials such as polyethylene, saran (vinylidene chloride), etc. would also be suitable.

In the showings of FIGS. 5–7, a sheet of vinyl plastic is sealed along one edge to form a hollow-ended tube. This may be done by any conventional process using any conventional adhesive or a heat sealing process also conventional. The inside diameter of the vinyl tube is predetermined and slightly less than the inside diameter of inner tube 43. One operator whose hand is shown at 56 in FIG. 5 thrusts the length of vinyl tubing into the free end of the tube 43 a distance sufficient to be reached by the operator 57 at the other end. Operator 56 folds the outer end of the tube over the greater outer diameter rim 43b where the natural resiliency of the vinyl sheet holds the end in place against normal pull. Operator 57 pulls the remainder of the tube through the perforated tube 43, aligns the seam of the tubing to be straight and rolls the other end of the vinyl tube 58 over the other greater diameter rim 43a. No vacuum is drawn on the device during these operations. Once the vinyl tubing is correctly placed, a vacuum is pulled through line 47 by conventional means (not shown) and the resultant relationship of the vinyl tube and the apparatus is shown in FIG. 6 with the vinyl tube uniformly held along its length to the inner tube 43. The rolled over ends of the tube relative the rims 43a and b provide a seal at each end to hold the vacuum.

While operators 56 and 57 are preparing the vinyl sheet as shown in FIGS. 5–7, the duct is being prepared for insertion into the expanding device 42. FIGS. 1 and 2 show the entire preferred apparatus arrangement before operations are begun with mandrel 24 prepared to receive a hollow duct out on the outer surface thereof and with the frame 41 in retracted position to permit the operators to insert the vinyl sheet therein. In FIG. 3, a hollow cylindrical duct 59 as above described is slid over the mandrel 24 and, thereafter, the rubber tubes 28 and 29 are expanded to grip the inner surface of the duct and fix it on the mandrel. The length of tube 43 or 51 is preferably at least as great as the length of the duct 59.

Once mounted on mandrel 24, duct 59 is pivoted on shaft 25 to the position of FIG. 4 wherein, while shaft 25 is rotated, adhesive of any desired conventional type is sprayed uniformly on the surface of the mandrel. Excess of adhesive is received in the vacuum tank 34. Adhesive applied, the shaft 25, mandrel 24 and duct 59 are pivoted to the position of FIG. 8. The extremities of the tracks 40 must be a sufficient distance from the frame 27 that the duct will be able to swing into the position of FIG. 8 without contacting the tube 43. Once in the position of FIG. 8 and with the sleeve drawn out to an expanded diameter greater than its normal inside diameter so as to place the sleeve under tension, one of the operators shoves the frame 41 toward the tank 34 along the tracks 40 so the tube 43 slides over duct 59. Once the duct is entirely received within the tube 43 and centered as desired therein, the vacuum may be released in the annulus between tubes 42 and 43 to permit the sleeve to contract onto the outer surface of the duct. The outer diameter of the duct is preferably slightly greater than the normal inside diameter of the sleeve so that the sleeve will be tensioned thereon to eliminate wrinkles and the like.

The sleeve must be of sufficient strength to withstand the desired expansion, but of sufficient resilience to permit such expansion under the conditions in the tube 42. The seam of the sheet 58 must be of sufficient strength also to stand the tension.

Figure 10:
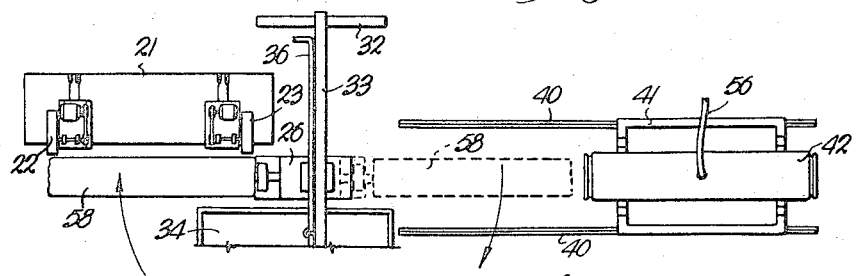
FIG. 10 is a sequential view of the process subsequen to FIG. 9 wherein the sleeve carrying duct has been re turned to the original duct mounting position.
Figure 11:
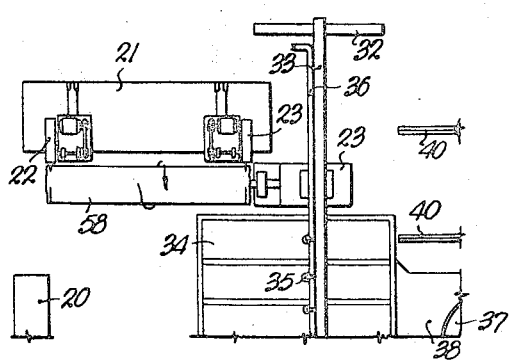
FIG. 11 shows a cutting operation wherein the end of the sleeve mounting duct are cut off.
Figure 12:
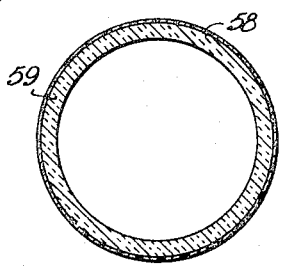
FIG. 12 is a cross-sectional view of the finished product

FIG. 10 shows in dotted lines the position of the mandrel and duct after the sleeve is positioned on the duct. The operators free the ends of the sleeve from the rims 43a and 43b and back off frame 41 carrying the tubes 42 and 43 to the position shown at the right in FIG. 10. Shaft 25 is then swung 180° in a clockwise direction as shown in FIG. 10 to the position shown in full lines. Saws 22 and 23 are movable to the positions shown in FIG. 11 so the blades thereof will cut through both the sheet 58 and the duct 59. Rotation of the saw blades while shaft 25 is rotating makes a clean circumferential cut at each end which squares the ends of the covered duct. FIG. 12 shows the finished product with the coating sealed onto the outside surface of the duct.

In the modification of FIGS. 13 and 14, therein is shown a resilient sleeve expanding device which employs but a single operator. The construction of FIGS. 5–7 requires two men, one at each end of the device. In the FIG. 13 and 14 modification, by merely sealing one end of the tube 58a by tying the end of an excessive length tube on itself, tying a string or resilient band around the end of an excessive length tube or heat sealing across the end of the tube after it is formed, a single operator may fit the open end of the tube 58a over the greater diameter rim 55, thus forming the vacuum seal, then merely thrust the remainder of the sealed tube 58a partly into the inner tube 51 and pull the vacuum. This snaps the sealed end of the tube out into the configuration shown in FIG. 14 and prepares the sheet or sleeve 58a in expanded position for mounting on a duct as previously described. In such arrangement, the open end of tube 51 may be next the tank 34 or the entire tube assembly 48 rotatable on frame 41 to move the open end to a position next the tank from any other loading position.

A typical vinyl film employed as a resilient sleeve in the invention would have a thickness of .004 to .006 inch and weight from 12 to 18 grams per square foot. The maximum tensile strength of such a film would be lengthwise from 9 to 18 pounds per inch width and crosswise from 8 to 15 pounds per inch width. Typical maximum elongation at rupture values for such a film would be lengthwise 175 percent to 230 percent and crosswise 250 percent to 260 percent. A typical film usable in the inventive method and apparatus could be characterized as a plasticized calendered vinyl sheeting which is flame resistant and offers a tear resistant flexible vapor barrier as applied to insulation products. The sheet or film may or may not be pigmented as with aluminum or like pigment to make it translucent or opaque. Cellulose acetate is another suitable material for such a resilient film. A typical adhesive usable for such use could be a dispersion of vinyl acetate polymer combined with inorganic fillers. Many conventional readily available commercial adhesives are usable in the process.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matters hereinabove set forth or shown in the accompanying drawings is to be interpreted as illustrative and not in a limiting sense.

Having thus described our invention, we claim:

1. Apparatus for applying resilient sleeves to work pieces comprising a mandrel adapted to receive a hollow work piece thereon, means mounting said mandrel for pivotal motion in a horizontal plane, vacuum means for receiving a sleeve of resilient material therein and expanding it to such internal size as to permit the work piece to fit therein, said means comprising an elongate outer shell forming a hollow outer tube, a perforate secondary shell positioned within and spaced inwardly from said outer tube and forming an inner hollow tube, the inner hollow tube sealingly connected circumferentially to the outer hollow tube at at least one position therealong whereby to form a continuous annular volume therebetween bounded at all points by the inner and outer hollow tubes, and a vacuum connection to said annular volume, means for rotating said mandrel with said work piece thereon, means for translating the vacuum means from a position free of the mandrel to a position surrounding same at one of the pivotal positions of said mandrel, and means for spraying adhesive on said work piece while it is being rotated on said mandrel at a second pivotal position of said mandrel.

2. Apparatus for applying resilient sleeves to work pieces comprising a mandrel adapted to receive a hollow work piece thereon, means mounting said mandrel for pivotal motion in a horizontal plane, said mandrel movable in a substantially 180° arc from a work piece mounting position to an adhesive applying position to a sleeve applying position, vacuum means for receiving a sleeve of resilient material therein and expanding it to such internal size as to permit the work piece to fit therein, said vacuum means comprising an elongate outer shell forming a hollow outer tube, a perforate secondary shell positioned within and spaced inwardly from said outer tube and forming an inner hollow tube, the inner hollow tube sealingly connected circumferentially to the outer hollow tube at at least one position therealong whereby to form a continuous annular volume therebetween bounded at all points by the inner and outer hollow tubes, and a vacuum connection to said annular volume, means for rotating said mandrel with said work piece thereon, means for spraying adhesive on said work piece while it is being rotated at said adhesive applying position, and means at said sleeve application position for translating the vacuum means from a position free of the mandrel to a position surrounding same.

3. Apparatus as in claim 2 including end trimming means at the work piece mounting position.

4. Apparatus for applying resilient sleeves to work pieces comprising a mandrel adapted to receive a hollow work piece thereon, means mounting said mandrel for pivotal motion in a horizontal plane, vacuum means for receiving a sleeve of resilient material therein and expanding it to such internal size as to permit the work piece to fit therein, said means comprising an elongate outer shell forming a hollow outer tube, a perforate secondary shell positioned within and spaced inwardly from said outer tube in forming an inner hollow tube, the inner hollow tube sealingly connected circumferentially to the outer hollow tube at at least one position thereal whereby to form a continuous annular volume there tween bounded at all points by the inner and outer hollow tubes, and a vacuum connection to said annular volume, means for translating the vacuum means from position free of the mandrel to a position surrounding same at one of the pivotal positions of said mandrel, means for applying adhesive to said work piece while positioned at a second pivotal position of said mandrel.

5. Apparatus for applying resilient sleeves to work pieces comprising a mandrel adapted to receive a hollow work piece thereon, means mounting said mandrel pivotal motion in a horizontal plane, said mandrel movable in a substantially 180° arc from a work piece mounting position to an adhesive applying position to a sleeve applying position, vacuum means for receiving a sleeve of resilient material therein and expanding it to such internal size as to permit the work piece to fit therein, said vacuum means comprising an elongate outer shell forming a hollow outer tube, a perforate secondary shell positioned within and spaced inwardly from said outer tube and forming an inner hollow tube, the inner hollow tube sealingly connected circumferentially to the outer hollow tube at at least one position therealong whereby to form a continuous annular volume therebetween bounded at all points by the inner and outer hollow tubes, and a vacuum connection to said annular volume, means for plying adhesive to said work piece while it is positioned at said adhesive applying position, and means at said sleeve application position for translating the vacuum means from a position free of the mandrel to a position surrounding same.

6. Apparatus for applying resilient sleeves to work pieces comprising a mandrel adapted to receive a hollow work piece thereon, means mounting said mandrel for pivotal motion in a horizontal plane, said mandrel movable in a substantial arc in said horizontal plane from a work piece mounting position to a sleeve applying position, vacuum means for receiving a sleeve of resilient material therein and expanding it to such internal size as to permit the work piece to fit therein, said vacuum means comprising an elongate outer shell forming a hollow outer tube, a perforate secondary shell positioned within and spaced inwardly from said outer tube and forming an inner hollow tube, the inner hollow tube sealingly connected circumferentially to the outer hollow tube at at least one position therealong whereby to form a continuous annular volume therebetween bounded at all points by the inner and outer hollow tubes, and a vacuum connection to said annular volume, and means at said sleeve application position for translating the vacuum means from a position free of the mandrel to a position surrounding same.

7. Apparatus as in claim 6 including means for rotating said mandrel with said work piece thereon and end trimming means at the work piece mounting position.

References Cited in the file of this patent

UNITED STATES PATENTS

| | | |
|---|---|---|
| 2,201,706 | Sukohl | May 21, 1940 |
| 2,560,369 | Roberts | July 10, 1951 |
| 2,570,259 | McKinley | Oct. 9, 1951 |